United States Patent [19]
Blalock et al.

[11] Patent Number: 6,028,382
[45] Date of Patent: Feb. 22, 2000

[54] TEMPERATURE SENSING ARRANGEMENT FOR THE STATOR CORE OF AN ELECTROMECHANICAL MACHINE

[75] Inventors: Christopher A. Blalock, Ellenboro; Dwight A. Bridges, Kings Mountain; Thomas R. Clark, Dallas; Stacy M. Kale, Shelby; Timothy A. Leu, Cherryville; Barry D. Melton, Bostic; Wayne A. Wasserman, Forest City, all of N.C.

[73] Assignee: Reliance Electrical Industrial Company, Cleveland, Ohio

[21] Appl. No.: 09/115,122

[22] Filed: Jul. 14, 1998

[51] Int. Cl.⁷ .................................................. H02K 11/00
[52] U.S. Cl. ........................................ 310/68 C; 361/25
[58] Field of Search ............................ 310/68 C; 361/23, 361/24, 25, 26, 27

[56] References Cited

U.S. PATENT DOCUMENTS

| | | | |
|---|---|---|---|
| 2,619,573 | 11/1952 | Dawson | 310/68 C |
| 2,717,945 | 9/1955 | Dresios et al. | 310/68 C |
| 3,433,313 | 1/1969 | Snoberger et al. | 310/68 C |
| 5,680,059 | 10/1997 | Shiota et al. | 324/772 |

OTHER PUBLICATIONS

MINCO Bulletin STD–3 *0.03 Stator Slot Sensors,* Minco Products, Inc., Minneapolis, MN, dated Feb. 1996.

*Primary Examiner*—Thomas M. Dougherty
*Assistant Examiner*—Burton Mullins
*Attorney, Agent, or Firm*—Craig N. Killen; John J. Horn; John M. Miller

[57] ABSTRACT

An arrangement for measuring the operating temperature of an electromechanical machine utilizes at least one elongate sensor device inserted into a winding slot of the stator core. The sensor device includes a lead attachment portion at which a plurality of relatively large gauge lead wires are attached. The lead wires preferably have a length sufficient to extend to a location outside of the motor housing. The sensor device includes an elongate sensing portion having temperature sensitive conductors. Preferably, the sensing portion is located entirely within the axial extent of the stator core. An elongate transition portion having temperature insensitive conductors provides electrical connection between the lead wires and the temperature sensitive conductors of the sensing portion.

20 Claims, 4 Drawing Sheets

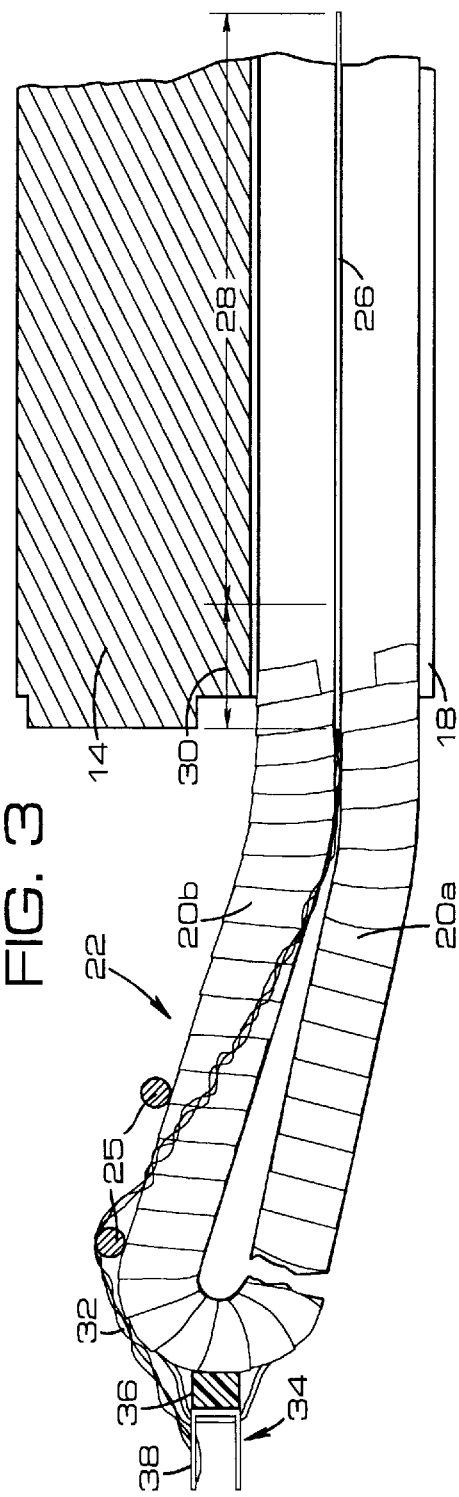
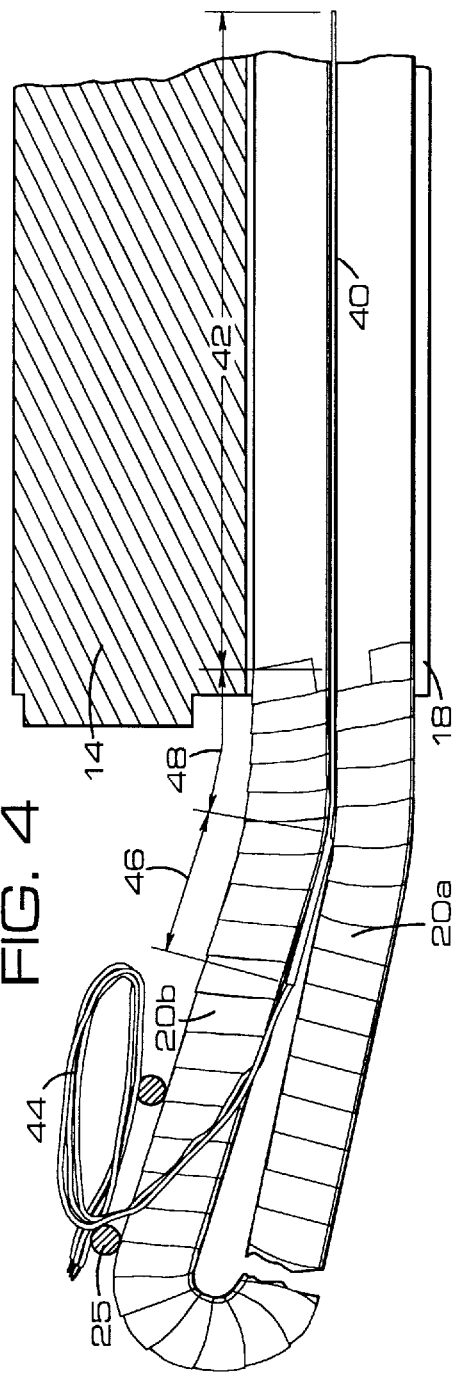

TEMPERATURE SENSING ARRANGEMENT FOR THE STATOR CORE OF AN ELECTROMECHANICAL MACHINE

BACKGROUND OF THE INVENTION

The present invention relates generally to the art of electric motors and other electromechanical machines. More particularly, the invention relates to an improved arrangement for sensing the operating temperature of an electric motor at its stator core.

It is often desirable to continuously monitor the operating temperature of an electric motor to prevent overheating or other undesirable conditions. Toward this end, various sensing arrangements have been embedded inside of the motor to provide an indication of the operating temperature. In one such arrangement, an elongate sensing device is inserted into a respective slot of the stator core. Typically, the elongate sensing device will be situated between respective windings located in the slot.

The sensing device includes an elongate sensing portion having temperature sensitive conductors operative to provide a variable resistance indicative of the operating temperature of the motor. The elongate sensing portion extends to an attachment portion, where lead wires are attached for providing the detected temperature to external equipment. While such arrangements have worked well for their intended purpose, they have given rise to difficulty in manufacturing. The various problems and drawbacks of the prior art will be described in more detail below.

SUMMARY OF THE INVENTION

The present invention recognizes and addresses the various disadvantages of prior art constructions and methods. In one aspect, the invention provides an improved stator apparatus for use in an electromechanical machine. The stator apparatus comprises a stator core constructed of a magnetically permeable material. The stator core defines a plurality of longitudinal slots extending in parallel along an inner surface thereof. At least one conductive winding is located in each of the longitudinal slots. One or more of the longitudinal slots has a respective temperature sensor device inserted therein. The temperature sensor device includes a lead attachment portion to which lead wires are attached, an elongate transition portion of a first predetermined length and an elongate sensing portion of a second predetermined length.

In some exemplary embodiments, the elongate sensing portion of the temperature sensor device is located entirely within the axial extent of the stator slot. Often, the elongate sensing portion will have a length of at least about 11.0 inches. The elongate transition portion will typically have a length of at least about 2.0 inches.

Preferably, the elongate transition portion of the temperature sensor device will be flexible in relation to the lead attachment portion and the elongate sensing portion. The elongate transition portion may be rendered flexible due to being thinner than the lead attachment portion and the elongate sensing portion. Often, the elongate transition portion will comprise conductive foil extending between respective of the lead wires and conductors of the elongate sensing portion.

The lead wires of the temperature sensor device will often be at least 18 gauge in size. The length of the lead wires may be greater than about 6 feet. It will often be desirable to twist the lead wires together along a substantial portion of their length.

In another aspect, the present invention provides a temperature sensor device for insertion into a stator slot of an electromechanical machine. The sensor device comprises an elongate member having a lead attachment portion, an elongate transition portion of a first predetermined length and an elongate sensing portion of a second predetermined length. A plurality of lead wires are attached to the elongate member at the lead attachment portion.

The elongate sensing portion of the elongate member has temperature sensitive conductors operative to yield a variable resistance depending on a temperature imposed thereon. In addition, the elongate transition portion has temperature insensitive conductors to provide electrical connection between the lead wires and the temperature sensitive conductors, without substantially affecting a temperature measurement provided thereby.

Other objects, features and aspects of the present invention are achieved by various combinations and subcombinations of the disclosed elements, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which:

FIG. 3 is an enlarged partial cross-sectional view taken along line 3—3 of FIG. 1, illustrating the manner in which the temperature sensor device of the prior art is inserted into the stator slot;

FIG. 4 is a view similar to FIG. 3 of an arrangement utilizing an improved temperature sensor device of the present invention;

Figure 1:
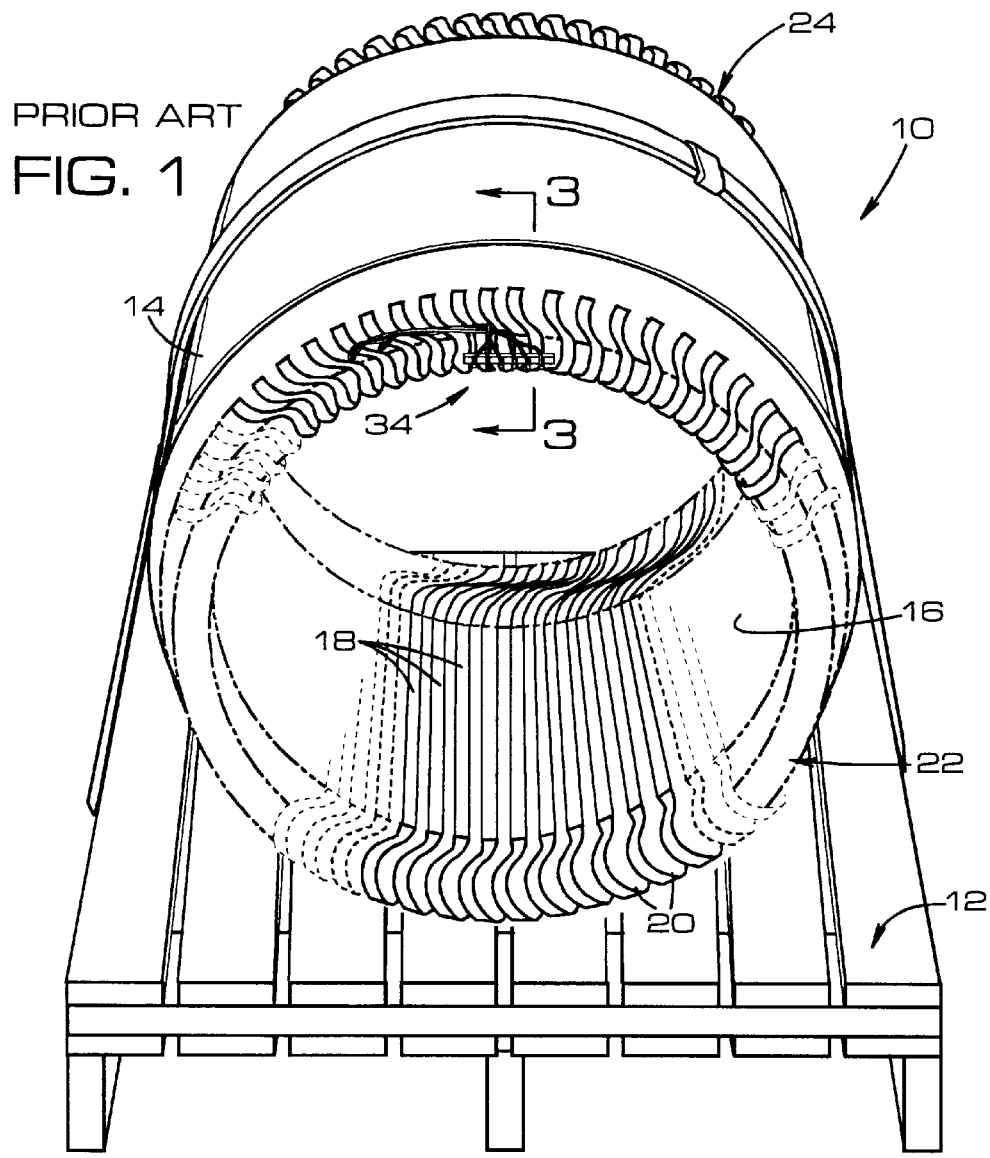
FIG. 1 is a perspective view of a stator apparatus for an electromechanical machine, including a temperature sensing arrangement of the prior art.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Before describing a preferred embodiment of the present invention, it is useful to discuss the prior art in greater detail. Thus, FIG. 1 illustrates a stator assembly 10 of the prior art as it may appear at an intermediate stage in the manufacturing process.

For example, stator assembly 10 may be about to undergo a vacuum pressure impregnation (VPI) operation to provide a protective coating of resin on its various surfaces. As can be seen, stator assembly 10 is located on a pallet, or "skid" 12, to facilitate transport around the factory floor.

As is well known, stator assembly 10 includes a core 14 of a magnetically permeable material. The rotor assembly of the electric motor will be received in a cylindrical opening of core 14, defined by inner surface 16. A plurality of longitudinal slots 18 extend in parallel to one another along the entire axial length of core 14. One or more conductive windings 20 are located in each of the longitudinal slots. The windings will extend beyond each axial end of core 14 to form respective coilheads 22 and 24.

Figure 2:
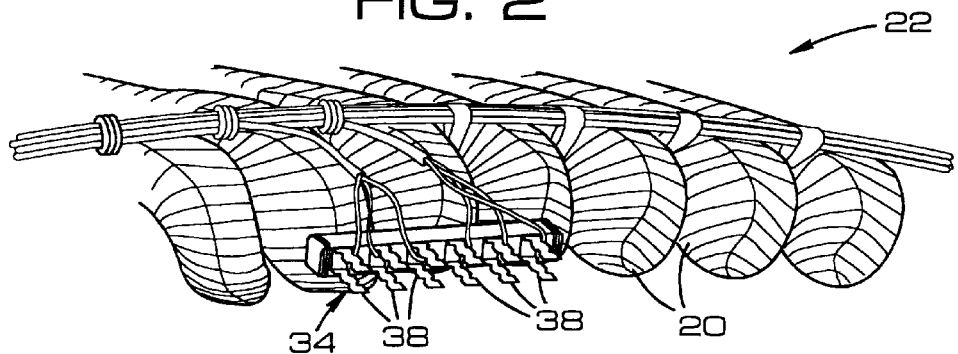
FIG. 2 is an enlarged view of a terminal strip utilized in the prior art temperature sensing arrangement of FIG. 1.

Referring now also to FIGS. 2 and 3, each of slots 18 will often contain more than one winding, particularly in the case of a multiphase motor. For example, each of slots 18 contains an "upper" winding 20a and a "lower" winding 20b in this case. As can be seen, each of the windings may be wrapped in a tape made of Teflon™ or other suitable material. Typically, the coilheads will be wrapped by a cord 25 to prevent the windings from spreading at this location.

Generally, several of the slots 18 will contain an elongate member 26 of a temperature sensor device.

Often, member 26 will be inserted between the respective upper and lower windings 20a and 20b, as shown. Sensors of this type, often referred to simply as "stator slot sensors," have been marketed for some time by Minco Products, Inc., 7300 Commerce Lane, Minneapolis, Minn. 55432.

Member 26 includes a sensing portion 28 and a lead attachment portion 30. Sensing portion 28 includes temperature sensitive conductors that provide a resistance varying in proportion to the operating temperature of the motor. A plurality of lead wires, collectively indicated at 32, extend from lead attachment portion 30 to provide electrical connection between external monitoring equipment and the temperature sensitive conductors of sensing portion 28. It can be seen that the thickness of member 26 is substantially uniform along its entire axial length.

The lead wires utilized in this arrangement have typically been of a relatively small size. For example, thirty gauge lead wires have been commonly used for this purpose. Generally, however, it is considered undesirable to have lead wires of such a small size extending all the way to the exterior of the motor housing. Thus, various techniques have been utilized to attach a larger gauge wire, such as eighteen gauge lead wire, to the smaller gauge lead wires after a very short length. For example, difficult butt-splicing techniques have been utilized to attach larger gauge lead wires.

Alternatively, as shown in FIGS. 1–3, a terminal strip 34 may be attached directly to the coilhead. As shown, terminal strip 34 includes a nonconductive base 36 to which a plurality of U-shaped conductive connectors 38 are attached. One lead wire from among lead wires 32 is attached to one leg of a respective connector 38. The larger gauge wires are attached at the second leg of each connector 38. The larger gauge wires can be made of any length necessary to extend to the exterior of the motor housing.

While generally effective for its intended purpose, the use of terminal strip 34 can introduce various inefficiencies into the manufacturing process.

For example, labor is involved in attaching terminal strip 34 to the coilhead. In addition, soldering of the individual leads to connectors of terminal strip 34 is relatively time consuming. This is particularly true if the stator assembly has undergone VPI, since hardened resin must be removed from terminal strip 34 before lead wires can be connected. In addition, terminal strip 34 presents a relatively fragile piece at the end of the coilhead, which can be easily damaged as the stator assembly is moved around the factory floor.

FIG. 4 illustrates an improved temperature sensor device constructed in accordance with the present invention. Like the sensor device of the prior art, this sensor device includes an elongate member 40 inserted between windings 20a and 20b. Elongate member 40 includes a sensing portion 42 preferably at least 11.0 inches in length having temperature sensitive conductors. A plurality of larger lead wires (collectively indicated at 44), such as eighteen gauge lead wires, are attached directly to member 40 at lead attachment portion 46. Member 40 further includes a transition portion 48 having temperature insensitive conductors. The temperature insensitive conductors of transition portion 48 provide electrical connection between the lead wires and the temperature sensitive conductors of sensing portion 42. Generally, transition portion 48 will be at least 2.0 inches in length.

Because larger gauge wires extend directly to member 40, the use of butt-splicing techniques or terminal strips to attach larger gauge wire can be eliminated. The larger gauge lead wires 44 can have any desired length, and are preferably long enough to extend to a location outside of the motor housing. For example, lead wires 44 may have a length of about six feet or more.

It can be seen that the larger wire produces a thickened area, or "boot," at lead attachment portion 46. This boot limits the extent to which sensor device 40 can be inserted between windings 20a and 20b. Without transition portion 48, part of sensing portion 42 may be located outside of slot 18, beyond the end face of core 14. This could affect the accuracy of any temperature reading obtained with the sensor device. Thus, transition portion 48 provides extra length to ensure that sensing portion 42 is maintained completely within the axial ends of core 14.

Figure 5:
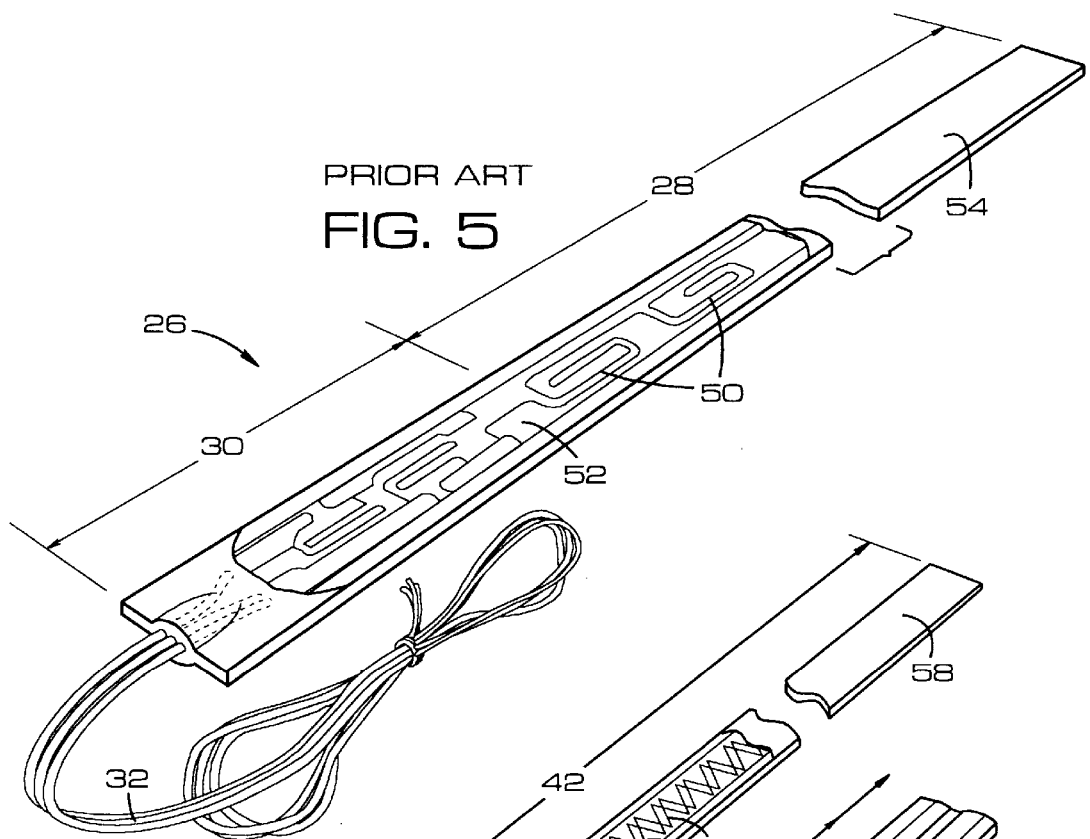
FIG. 5 is an enlarged perspective view of the temperature sensor device shown in FIG. 3.

FIG. 5 illustrates further details of the sensor device of the prior art described above. As can be seen, the temperature sensitive conductors define a series of loops 50 along the length of sensing portion 28. The conductors themselves are formed as traces on the surface of an elongate substrate 52 of a circuit board material. Substrate 52, with the conductors carried thereon, is embedded in a hardened polymeric body 54 to form a composite structure.

Figure 6:
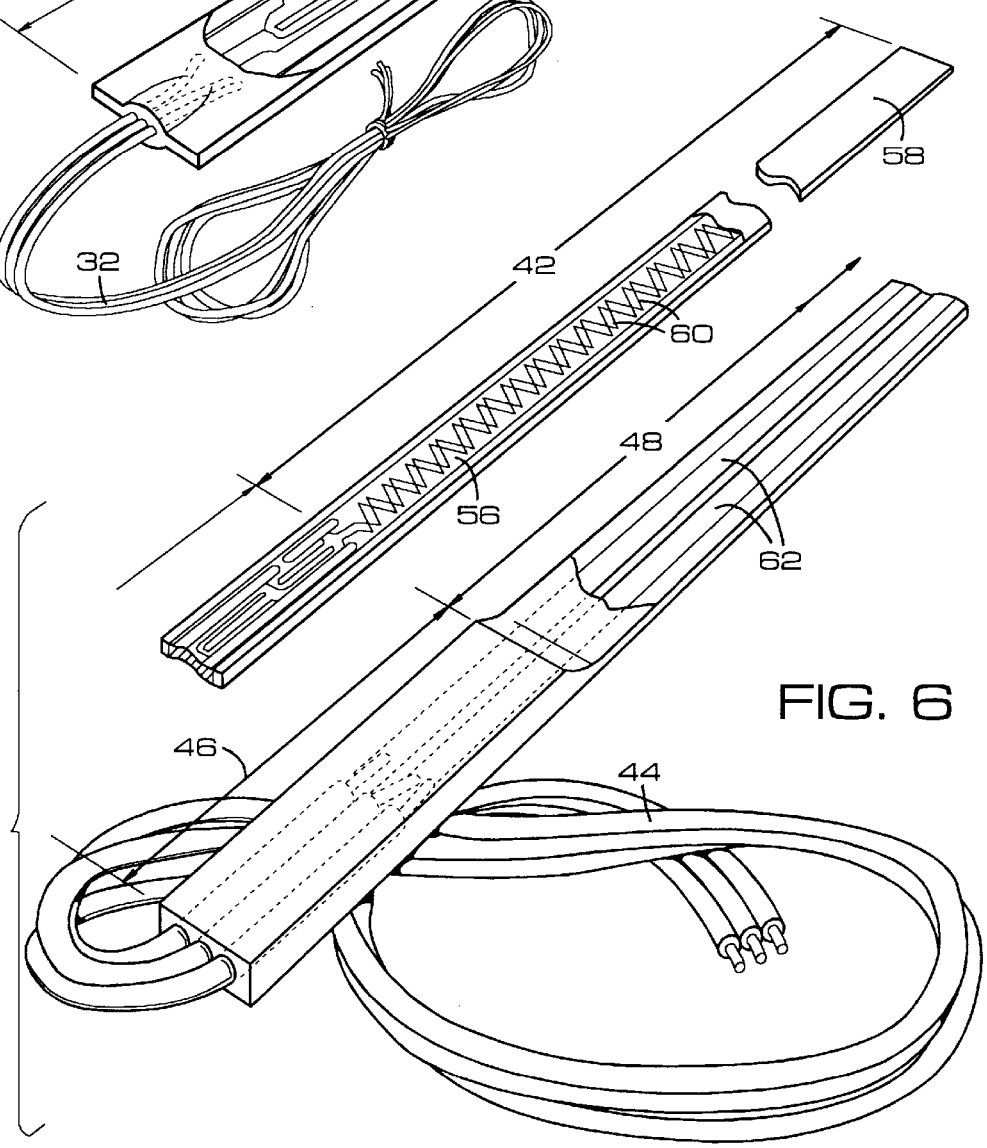
FIG. 6 is a view similar to FIG. 5 illustrating a temperature sensor device of the present invention.

As can be seen on FIG. 6, the construction of the sensing device of the present invention is similar in some conventional aspects to that of the prior art sensor device. For example, the conductors are preferably defined on an elongate substrate 56 preferably made of a circuit board material. Substrate 56 and the conductors carried thereon are embedded in a hardened polymeric body 58 to form a composite structure.

While the temperature sensitive conductors could have been formed as loops (like those of elongate member 26), they have been formed as a series of criss-crossed conductors 60. It will be appreciated that steps are taken to ensure the conductors are electrically isolated from one another at the crossing points to prevent shorting. The temperature insensitive conductors of transition portion 48 are formed as straight conductive traces 62 of etched foil or the like on the surface of substrate 56.

Figure 7:
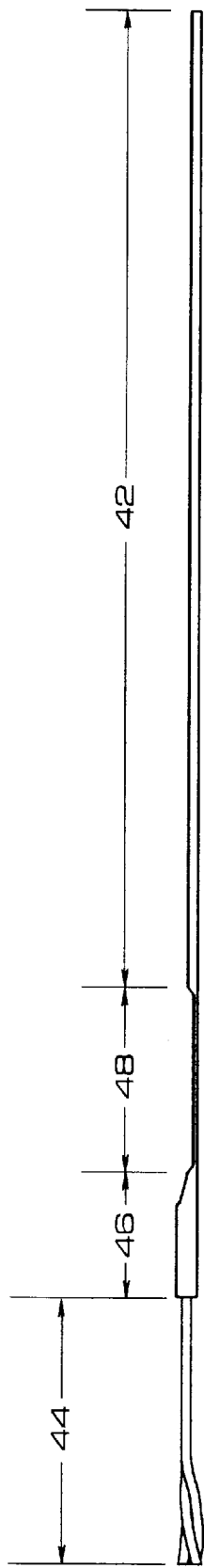
FIG. 7 is a side elevation of the temperature sensor device of the present invention.

FIG. 7 shows an elevational view of member 40. As can be seen, the "boot" of lead attachment portion 46 is thicker than sensing portion 42. Transition portion 48, on the other hand, is preferably thinner than both sensing portion 42 and lead attachment portion 46. As a result, member 40 will be flexible at this location to permit bending during insertion into the stator slot. The thickness of the boot at lead attachment portion 46 advantageously "stops" the insertion of member 40, thus providing consistency during the manufacturing process. Lead wires 44 are preferably twisted along a substantial portion of their length.

Figure 8:
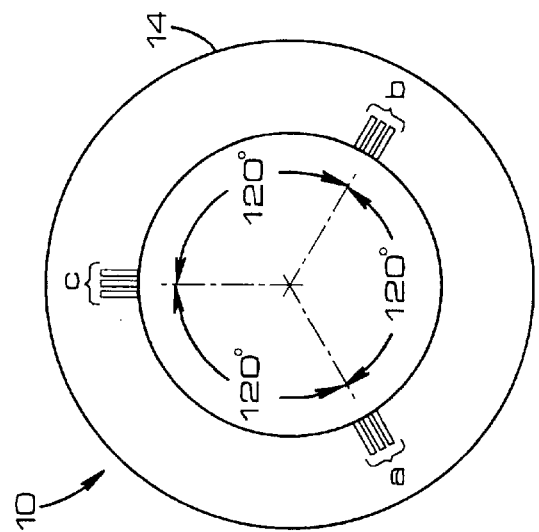
FIG. 8 is a diagrammatic representation showing the relative positions at which a plurality of temperature sensor devices may be placed in the stator core of a multiphase motor.

As noted above, multiple sensor devices will often be used in a single stator apparatus. For example, FIG. 8 shows three groups of sensor devices (designated "a," "b" and "c") spaced 120° apart about the inside surface of core 14. Each of the groups has three sensor devices, one corresponding to each phase of the motor.

It can thus be seen that the present invention provides an improved temperature sensing arrangement for use in an electromechanical machine. While preferred embodiments of the invention have been shown and described, modifications and variations may be made thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A stator assembly for use in an electromechanical machine, said assembly comprising:
    a stator core constructed of a magnetically permeable material, said stator core defining a plurality of longitudinal slots extending in parallel along an inner surface thereof;
    at least one conductive winding located in each of said longitudinal slots;
    at least one temperature sensor device having an elongate member inserted into one of said longitudinal slots and having sensor lead wires extending therefrom, said elongate member including a lead attachment portion, an elongate transition portion of a first predetermined length and an elongate sensing portion of a second predetermined lengths;
    said elongate sensing portion of said elongate member having temperature sensitive conductors operative to yield a variable resistance depending on a temperature imposed thereon: and
    said elongate transition portion of said elongate member having temperature insensitive conductors to provide electrical connection between said lead wires and said temperature sensitive conductors without substantially affecting a temperature measurement provided thereby.

2. A stator assembly as set forth in claim 1, wherein said lead wires of said temperature sensor device are at least eighteen gauge in size.

3. A stator assembly as set forth in claim 1, wherein said elongate sensing portion is located entirely within said one of said longitudinal slots without extending axially beyond said stator core.

4. A stator assembly as set forth in claim 3, wherein said lead wires have a length of at least about 6.0 feet.

5. A stator apparatus as set forth in claim 3, wherein said second predetermined length of said elongate sensing portion is at least about 11.0 inches.

6. A stator assembly as set forth in claim 5, wherein said first predetermined length of said elongate transition portion is at least about 2.0 inches.

7. A stator assembly for use in an electromechanical machine, said assembly comprising:
    a stator core constructed of a magnetically permeable material, said stator core defining a plurality of longitudinal slots extending in parallel along an inner surface thereof:
    at least one conductive winding located in each of said longitudinal slots; and
    at least one temperature sensor device having an elongate member inserted into one of said longitudinal slots and having sensor lead wires extending therefrom, said elongate member including a lead attachment portion, an elongate transition portion of a first predetermined length and an elongate sensing portion of a second predetermined length, said elongate transition portion being flexible in relation to said lead attachment portion and said elongate sensing portion.

8. A stator assembly as set forth in claim 7, wherein said elongate transition portion is rendered flexible due to being thinner than said lead attachment portion and said elongate sensing portion.

9. A stator assembly as set forth in claim 7, wherein said elongate transition portion comprises conductive foil extending between said lead wires and conductors of said elongate sensing portion.

10. A stator assembly for use in an electromechanical machine, said assembly comprising;
    a stator core constructed of a magnetically permeable material, said stator core defining a plurality of longitudinal slots extending in parallel along an inner surface thereof;
    at least one conductive winding located in each of said longitudinal slots:
    at least one temperature sensor device having an elongate member inserted into one of said longitudinal slots and having sensor lead wires extending therefrom, said lead wires having a length of at least about 6.0 feet and being twisted together along a substantial portion of their length; and
    said elongate member including a lead attachment portion, an elongate transition portion of a first predetermined length, and an elongate sensing portion of a second predetermined length being located entirely within one of said longitudinal slots without extending beyond said stator core.

11. A temperature sensor device for insertion into a stator slot of an electromechanical machine, said sensor device comprising:
    an elongate member having a lead attachment portion, an elongate transition portion of a first predetermined length and an elongate sensing portion of a second predetermined length;
    a plurality of lead wires attached to said elongate member at said lead attachment portion;
    said elongate sensing portion having temperature sensitive conductors operative to yield a variable resistance depending on a temperature imposed thereon; and
    said elongate transition portion having temperature insensitive conductors to provide electrical connection between said lead wires and said temperature sensitive conductors without substantially affecting a temperature measurement provided thereby.

12. A temperature sensor device as set forth in claim 11, wherein said elongate transition portion is flexible in relation to said lead attachment portion and elongate sensing portion.

13. A temperature sensor device as set forth in claim 12, wherein said elongate transition portion is rendered flexible due to being thinner than said lead attachment portion and said elongate sensing portion.

14. A temperature sensor device as set forth in claim 12, wherein said elongate transition portion comprises conductive foil extending between said lead wires and said temperature sensitive conductors.

15. A temperature sensor device as set forth in claim 11, wherein said second predetermined length of said elongate sensing portion is at least about 11.0 inches.

16. A temperature sensor device as set forth in claim 15, wherein said first predetermined length of said elongate transition portion is at least about 2.0 inches.

17. A temperature sensor device as set forth in claim 11, wherein said lead wires of said temperature sensor device are at least 18 gauge in size.

18. A temperature sensor device as set forth in claim 17, wherein said lead attachment portion defines a boot of enhanced thickness in relation to said transition portion and said temperature sensing portion.

19. A temperature sensor device as set forth in claim 17, wherein said lead wires have a length of at least about 6.0 feet.

20. A temperature sensor device as set forth in claim 19, wherein said lead wires are twisted together along a substantial portion of their length.

\* \* \* \* \*